(12) United States Patent
Shah et al.

(10) Patent No.: US 6,821,547 B2
(45) Date of Patent: Nov. 23, 2004

(54) POLYMERIZATION OF MONO AND DISACCHARIDES WITH MONOCARBOXYLIC ACIDS AND LACTONES

(75) Inventors: Pankaj Shah, Lake Bluff, IL (US); Håkan Gros, Kantvik (FI); Bengt Lindholm, Kirkkonummi (FI)

(73) Assignee: Danisco USA, Inc., Ardsley, NY (US)

( * ) Notice: Subject to any disclaimer, the term of this patent is extended or adjusted under 35 U.S.C. 154(b) by 339 days.

(21) Appl. No.: 10/117,670

(22) Filed: Apr. 4, 2002

(65) Prior Publication Data

US 2003/0044513 A1 Mar. 6, 2003

Related U.S. Application Data

(60) Provisional application No. 60/282,805, filed on Apr. 10, 2001.

(51) Int. Cl.$^7$ ................................................. A23L 1/236
(52) U.S. Cl. ................ 426/658; 536/123.1; 536/123.13; 536/126; 127/30; 127/42; 127/46.2
(58) Field of Search ....................... 426/658; 536/123.1, 536/123.13, 126; 127/30, 40, 42, 46.2

(56) References Cited

U.S. PATENT DOCUMENTS 3,766,165 A * 10/1973 Rennhard ................ 536/123.1
3,876,794 A * 4/1975 Rennhard ................... 426/548
4,631,195 A * 12/1986 Colliopoulos et al. ...... 426/548
5,051,500 A * 9/1991 Elmore ........................ 536/50
5,091,015 A * 2/1992 Bunick et al. ................ 127/30
5,728,397 A * 3/1998 Fuisz .......................... 424/439

FOREIGN PATENT DOCUMENTS

GB          2 276 173       * 9/1994

* cited by examiner

Primary Examiner—N. Bhat
(74) Attorney, Agent, or Firm—Scully, Scott, Murphy & Presser

(57) ABSTRACT

The present invention is directed to a process and product by process for preparing a carbohydrate polymer which comprises polymerizing a sugar at a temperature below the point of substantial decomposition thereof and under reduced pressure in the presence of a catalytic effective amount of an organic acid selected from the group consisting of a monocarboxylic acid, a lactone of a monocarboxylic acid and arylol, while removing water formed during said polymerization, said organic acid being non-volatile and having only one acidic functionality and having no amino groups thereon.

95 Claims, No Drawings

POLYMERIZATION OF MONO AND DISACCHARIDES WITH MONOCARBOXYLIC ACIDS AND LACTONES

RELATED APPLICATION

This application claims priority of Provisional Application No. 60/282,805, filed Apr. 10, 2001.

FIELD OF THE INVENTION

The invention relates to a novel method for the preparation of polydextrose, the product formed therefrom and to foodstuffs containing said polydextrose.

BACKGROUND OF THE INVENTION

Polydextrose is a water-soluble, low-calorie, non-cariogenic bulking agent in food which contributes the bulk and texture normally associated with sugars in many food products. It is also used as an excipient in pharmaceutical products. Polydextrose is a randomly bonded highly branched glucose polymer.

Polydextrose is an essentially low-calorie sugar substitute which has many of the technological properties of sugar without the sweetness. It has been used most advantageously where conventional sugar based compositions have proven to be too sweet. This non-sweet bulking agent is especially useful when used in combination with high intensity sweeteners to provide low-calorie food products having the desirable texture of conventional sugar-containing food products without the calories associated with those products.

Polydextrose is commercially available in various forms, such as Polydextrose A, an amorphous, slightly acidic (pH of 2.5–3.5) fusible powder; Polydextrose N, a potassium hydroxide partially neutralized (pH of 5–6) light-colored 70% aqueous solution of Polydextrose A; and Polydextrose K, a potassium bicarbonate partially neutralized (pH of 5–6) powder form of Polydextrose A.

Polydextrose is also available in another form, which has been designated as Improved Polydextrose, a form of Polydextrose A which is substantially free of certain low molecular weight organic acids (pH of 3–4).

Commercial polydextrose is prepared in accordance with the procedure described in U.S. Pat. Nos. 3,766,165 and 3,876,794, both to Rennhard. They disclose a procedure for preparing carbohydrate polymers, including polydextrose by melting a dry saccharide selected from the group consisting of glucose and maltose at a temperature below the point of substantial decomposition of the saccharide, maintaining the molten saccharide at a temperature ranging from 140° C. to 295° C. and at a reduced pressure in the presence of a catalytic amount up to 10 mol percent of a food acceptable polycarboxylic acid catalyst and in the substantial absence of water until substantial polymerization occurs and simultaneously removing water formed during melting and polymerization. Both the '165 and '794 Patents require polycarboxylic acids having at least two carboxyl groups. That is, both require carboxylic acids having at least two acidic protons thereon. Examples of the polycarboxylic acids used in the process in the '165 and '794 patents include citric acid, fumaric acid, tartaric acid, succinic acid, adipic acid, itaconic acid, and malic acid and the anhydride of succinic, adipic and itaconic acids. The polycarboxylic acids are not only used as catalysts but also are cross-linking agents and polymerization activators.

Both the '165 and the '794 patents teach away from the use of monocarboxylic acids in the process for preparing the carbohydrate polymers. More specifically, they both state that monocarboxylic acids will not be effective as cross-linking agents and will not be as satisfactory as polycarboxylic catalysts in anhydrous melt polymerization.

Thus, based on the teachings therein, it was doubtful that the polycondensation for preparing polydextrose could be prepared in the presence of a monocarboxylic acid containing only one acidic hydrogen therein.

U.S. Pat. No. 5,051,500 to Elmore discloses a continuous polydextrose process in which maltose or glucose, polyol and edible carboxylic acid are each conveyed in separate streams into an apparatus having a vented chamber with means for conveying the ingredients longitudinally through the chamber with lateral mixing and minimal longitudinal mixing, then mixed together and melted in a first zone and conveyed to a second zone and finally reacted under reduced pressure. Elmore, et al. also teach away from the use of monocarboxylic acids in their process, stating that they will not act as comonomers and may not be effective as crosslinking agents, and further that they will not be as satisfactory as polycarboxylic acids as catalysts in anhydrous melt polymerization.

Japanese patents 01012761, 01012762 and 5087083 describe the use of phosphoric acid in the process of preparing polydextrose. The concentration of phosphoric acid utilized is at about 0.1%. They do not suggest the use of any other acid catalyst.

Water soluble polydextrose (also known as polyglucose or poly D-glucose) is commercially prepared by melting and heating dextrose (also known as glucose or D-glucose) preferably with about 5–15% by weight of sorbitol present, in the presence of a catalytic amount (about 0.5 to 3.0 mol %) of citric acid, a dicarboxylic acid.

Water-soluble polydextrose is an item of commerce which, as an approved food additive, is defined in the Food and Drug Section of the Code of Federal Regulations (21 C.F.R. 172.841). In its unimproved form, it is also described by Rennhard, U.S. Pat. No. 3,766,165, as a "[w]ater-soluble highly branched poly[dextrose] wherein the linkage of 1→6 predominates, having . . . average molecular weight between about 1,500 and 18,000 and containing from about 0.5 to 5 mole percent of [citric] acid ester groups . . . ", i.e., water-soluble polydextrose is characterized by its content of from about 0.5 to 5 mol % of bound citric acid. According to Rennhard, the water-soluble polydextrose is preferably prepared using 0.5–5 mol percent of citric acid as catalyst. However, Rennhard's use of about 6 mol percent of citric acid produced more than two thirds undesired insoluble polydextrose. Rennhard also specified the optional use of about 5–20% (preferably 8–12%) by weight of sorbitol in the polymerization. The narrower range approximates the 10% by weight of sorbitol also noted in the C.F.R., cited above.

It has been alleged that the commercially prepared polydextrose utilizing the process described hereinabove has an off-flavor associated therewith. To minimize off flavor, commercial polydextrose is further refined on an ion-exchange column.

The present inventor has found that the off-flavor can be significantly reduced or eliminated if monocarboxylic acid is utilized in the preparation of the polydextrose. The present inventor has found that monocarboxylic acids having only one acidic hydrogen atom or lactones thereof can be used instead of dicarboxylic acid in catalytic amounts in the preparation of polydextrose, contrary to the teachings of Rennhard, supra. Moreover, he has found that the product so produced does not exhibit the off-flavor found in polydextrose produced using citric acid.

SUMMARY OF THE INVENTION

Accordingly, the present invention is directed to a process for preparing a carbohydrate polymer which comprises polymerizing a sugar selected from the group consisting of monosaccharide, disaccharide, oligosaccharide and hydrolysate of a carbohydrate polymer at a temperature below the substantial decomposition of said sugar and at a reduced pressure under effective polymerization conditions in the presence of a catalytic amount of a monocarboxylic acid or lactone thereof or an arylol while removing the water formed during said polymerization, said monocarboxylic acid or lactone thereof being non-volatile and having only one acidic functionality thereon, while said arylol is non-volatile and has only one or two acidic functionalities thereon. In a preferred embodiment, a food acceptable polyol is included in the reaction mixture. The present invention is also directed to the product thus formed and to a foodstuff containing said carbohydrate polymer.

DETAILED DESCRIPTION OF THE INVENTION

As used herein, the term "carbohydrate polymer" is a carbohydrate polymer formed from monosaccharides. The monosaccharides contain from 3–6 carbon atoms and include aldoses and ketoses. Examples of monosaccharides include glyceraldehyde, erythrose, threose, ribose, arabinose, xylose, lyxose, allose, altrose, glucose, mannose, gulose, idose, galactose, talose, dihydroxyacetone, erythrulose, ribulose, xylulose, psicose, fructose, sorbose and tagatose and the like. The monosaccharides may exist as either the D or L isomers.

The preferred monosaccharides contain 5 or 6 carbon atoms. The most preferred monosaccharide is glucose.

Both the D and L forms as well as mixtures thereof, including racemic mixtures thereof are contemplated to be within the scope of the present invention. However, the preferred stereoisomer is the D form. A "disaccharide" is defined herein contains two sugar units. The sugar units may be the same or different. Examples include trehalose, isomaltose, isomaltulose, and the like.

An oligosaccharide is defined herein contains 3–10 sugar units and more preferably 3–6 sugar units which may be the same or different. Examples include fructoligosaccharides, maltotriose, and the like.

An embodiment of the present invention requires the use of a monocarboxylic acid or lactones thereof as a catalyst. As used herein, the term "catalyst" refers to a substance that accelerates the rate of the reaction. However, unlike most catalysts, certain catalysts, when utilized in the present invention, viz., monocarboxylic acid and/or the lactones thereof, are partially consumed, and become associated with the carbohydrate polymer product. However, these catalysts do not act like reactants, as minute amounts of catalyst is associated with the product. In another embodiment, the acid catalyst is an arylol.

As indicated hereinabove, the catalysts used in the present invention are relatively non-volatile, since volatile acids may be vaporized during the polymerization reaction described herein. If utilized in foods, the monocarboxylic acids, the lactones thereof or arylols are food acceptable, that is, palatable and free of significant adverse effects at the level of ordinary use. Inedible monocarboxylic acids or lactones thereof or arylols are also chemically suitable for use in the process described herein, and may be used, in addition to the food acceptable acids and lactones, when the carbohydrate polymers produced in accordance with the present invention, is utilized in industrial applications. However, it is preferred that the acid catalysts used are non-toxic to mammals, especially humans. Moreover, the acid catalysts carboxylic acids and/or lactones thereof or arylols do not contain any basic functionalities, e.g., amino groups which are capable of being proton acceptors. Moreover, the monocarboxylic acids only contain one COOH group. Thus, the lactones utilized in the present invention are prepared from carboxylic acids containing one carboxy group. Furthermore, the arylols may contain 0 or 1 carboxy groups thereon.

The monocarboxylic acids used in the present process are organic monocarboxylic acids. They may be straight chained, branched or cyclic; they may be aliphatic, e.g., alkyl, alkenyl or alkynyl, aryl or aryl alkyl monocarboxylic acids; heterocyclic or heterocyclic alkyl monocarboxylic acids; carbohydrate or hydroxy acids, including sugar monocarboxylic acids and steroidal monocarboxylic acids. They also may be hydroxy acids or keto acids.

The organic acid may be unsubstituted or substituted with one or more electron donating or electron withdrawing groups, as those terms are defined by one of ordinary skill in the art. Examples of electron donating groups and electron withdrawing groups include hydroxy, lower alkoxy, halo, nitro, cyano, lower alkyl, lower alkenyl, lower alkynyl, aryl, aryl lower alkyl, thiol, lower thioalkyl, lower alkanoyl, formyl and the like. However, the organic acid, substituents on the organic acid may not be substituted with a group having a basic functionality, such as an amine, alkyl-amine or dialkylamine or another carboxylic acid substituent or derivative thereof, e.g., ester, amide, and the like.

In one embodiment of the present invention, the monocarboxylic acids used in the present invention are defined by the formula RCOOH, wherein R is alkyl, alkenyl, alkynyl, cycloalkyl, cycloalkenyl, aryl, aryl alkyl, heterocyclic, heterocyclic alkyl,

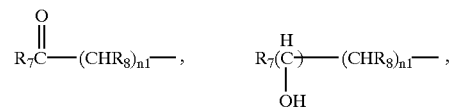

or a steroid wherein $R_7$ is lower alkyl or aryl or lower aryl alkyl; $R_8$ is lower alkyl or aryl or lower aryl alkyl and $n_1$ is 0–10 and more preferably 0 or 1 and most preferably 0.

The R group may be unsubstituted or substituted with electron donating or electron withdrawing groups. It is preferred that the R group is either unsubstituted or substituted with lower alkyl, hydroxy, lower alkoxy, alkylcarbonyloxy, or oxo

group. Moreover, the lower alkyl and lower alkoxy groups may, in turn, be substituted with hydroxy, lower alkoxy, lower alkyl and the like.

The acid utilized in the process is preferably a food acceptable acid and is relatively non-volatile.

Preferred alkyl groups for R include alkyl groups containing 1–30 carbon atoms in the main chain and up to a total of 35 carbon atoms. It is preferred that the alkyl group contains 1–24 carbon atoms. The alkyl group can be straight chained or branched. Examples of RCOOH used in accordance with the present invention include formic acid, acetic acid, propionic acid, butyric acid, valeric acid, caproic acid, caprylic acid, lauric acid, myristic acid, palmitic acid, stearic acid and the like.

"Lower alkyl", when used alone or in conjunction with other groups, is meant to convey an alkyl group containing 1–6 carbon atoms. Examples of lower alkyl groups include methyl, ethyl, propyl, isopropyl, butyl, isobutyl, sec-butyl, neopentyl, pentyl, isopentyl, hexyl and the like.

An "alkenyl group", as defined herein, when used alone or in conjunction with other groups, refers to an alkenyl group containing 2–30 carbon atoms and more preferably 2–24 carbon atoms. The alkenyl groups may be straight-chained or branched. They may be monounsaturated or polyunsaturated. It is preferred that the alkenyl group contains 1, 2, 3, 4, 5 or 6 carbon-carbon double bonds and more preferably 1–4 carbon-carbon double bonds and most preferably 1 or 2 carbon-carbon double bonds.

By "lower alkenyl", is meant an alkenyl group containing 2–6 carbon atoms, which may be branched or straight-chained. Examples include ethenyl, allyl, 2-propenyl, 1-butenyl, 2-butenyl, 2-methyl-1-propenyl and the like.

By "alkynyl" as used herein is meant an alkynyl group containing 2–30 carbon atoms and more preferably 2–24 carbon atoms. The alkynyl groups may be straight chained or branched. The preferred alkynyl group is lower alkynyl, wherein the alkynyl group contains 2–6 carbon atoms. Examples include ethynyl, 1-propynyl, 2-propynyl, 1-butynyl, 2-butynyl, and the like.

It is preferred that the alkynyl group contain no more than 4 carbon-carbon triple bonds and more preferably 1 or 2 carbon-carbon triple bonds and most preferably one carbon-carbon triple bond.

It is preferred that the alkyl, alkenyl and alkynyl groups are all unsubstituted or if substituted, they may be substituted with one or more of the groups defined hereinabove. Nevertheless, if substituted, it is preferred that they are substituted with one or more lower alkyl, lower alkenyl, hydroxy, lower alkoxy or oxo groups. Thus, for example, pyruvic acid, lactic acid, glycolic acid, and the like are contemplated to be within the scope of RCOOH.

The monocarboxylic acids, as defined herein, include fatty acids. A fatty acid, as defined herein, is a carboxylic acid derived from or contained in an animal or vegetable fat or oil. They are composed of a chain of alkyl groups containing from 4 to 26 carbon atoms. They may be saturated, such as butyric, lauric, palmitic, stearic acids and the like or unsaturated, containing one or more carbon-carbon double bonds, such as oleic acid, linoleic acid, linolenic acid, arachidonic acid, 1- or 2-butanic acid, sorbic acid, and the like. As defined herein, the term includes omega 3-fatty acids.

As defined herein, the R group may be a cycloaliphatic monocarboxylic acid, wherein the cycloaliphatic is cycloalkyl or cycloalkenyl. The cycloaliphatic group may be unsubstituted or substituted with any one of the substituents described hereinabove.

A preferred cycloalkyl group contains 3–18 ring carbon atoms, and up to a total of 24 carbon atoms. Moreover, preferably, it contains 5–18 ring carbon atoms. It may be monocyclic, bicyclic or polycyclic. It is preferred that it contains 1, 2, 3 or 4 rings. It is also preferred that the rings are fused. In the most preferred embodiment, the cycloalkyl group contains 5, 6 or 10 ring carbon atoms. Examples of cycloalkyl acid include quinic acid, cyclohexane-carboxylic acid and the like.

A preferred cycloalkenyl group contains 5–18 ring carbon atoms and up to a total of 6 carbon-carbon double bonds, and up to a total of 24 carbon atoms. As defined herein, the term cycloalkenyl excludes aryl, as aryl is defined separately hereinbelow. The cycloalkenyl groups may be monocyclic, bicyclic or polycyclic. It is preferred that the rings are fused. The cycloalkenyl group contains 1, 2, 3, 4, 5 or 6 carbon-carbon double bonds, and more preferably 1 or 2 carbon-carbon double bonds, and more preferably 1 double bond. It is preferred that the cycloalkenyl group contains 5, 6 or 10 ring carbon atoms.

As defined herein, R may be aryl or arylalkyl, wherein aryl as defined herein, either alone or in conjunction with other groups, is an aromatic compound containing only ring carbon atoms and preferably containing 6–18 ring carbon atoms and up to a total of 24 carbon atoms. The aryl groups may contain 1 ring or more than one ring, although it is preferred that it contains 1, 2, 3 or 4 rings. Moreover, it is preferred that the rings are fused. The aryl rings may be unsubstituted or substituted with one or more of the substituents described hereinabove. If substituted, it is preferred that the substituents are oxo, lower alkyl, hydroxy, halo, lower alkoxy, and the like. Examples of R include phenyl, naphthyl, xylyl, tolyl and the like. Thus, the monocarboxylic acids utilized in the present invention include salicylic acid, acetyl salicylic acid, phenylacetic acid, benzoic acid, o-toluic, m-toluic, p-toluic, hydroxybenzoic acid, methoxybenzoic acid, chlorobenzoic acid, bromobenzoic acid, nitrobenzoic acid, cinnamic acid, ferulic acid and the like.

As defined herein, R may be heterocyclic or heteroaromatic, whereby the cyclic aliphatic or aromatic rings, as defined hereinabove, have at least one of the carbon atoms replaced by a heteroatom, such as O or S. It is preferred that not more than 4 carbon atoms are replaced by a heteroatom, such as O or S. More preferably, it is preferred that the heterocyclic or heteroaromatic groups contain 1, 2 or 3 ring heteroatoms. The heterocyclics include the benzoheterocyclics. Examples include furyl, tetrahydrofuryl, thienyl and the like. It is preferred that the heterocyclic does not contain a basic nitrogen atom.

R may also be heterocyclic alkyl or heteroaromatic alkyl.

Another embodiment of the present invention includes sugar acids which are prepared from the corresponding sugar by techniques known by one of ordinary skill in the art. For example bromine water oxidizes aldoses to aldonic acids. Both uronic acid and aldonic acids are contemplated to be used in the present process. The sugars from which the sugar acids are prepared are monosaccharides, disaccharides or oligosaccharides. The preferred sugars from which the aldonic and uronic acids are prepared are aldoses. The sugars preferably are monosaccharides and contain 3–6 carbon atoms. Examples of aldose sugars include glyceraldehyde, erythrose, threose, ribose, arabinose, xylose, lyxose, allose, altrose, glucose, mannose, gulose, idose, and galactose. It is preferred that the aldoses are in the D-configuration. Thus, the monocarboxlic acids utilized in the process of the present invention include the corresponding uronic acid and aldonic acids of the aforementioned D-sugars. Examples include D-glucuronic acid, gulose uronic acid, n-acetyl neuraminic acid, deoxyoctulosomic acid, and the like.

Steroidal monocarboxylic acids are also contemplated to be within the scope of the monocarboxylic acids used in the present invention. The steroid is either substituted directly by a carboxyl group or indirectly by a carboxy group through an intervening bridging group, such as e.g., alkylene, alkenylene, arylalkylene, arylkenylene, alkoxy, thioalkyl, alkanoyl, and the like. The bridging groups may be further unsubstituted or substituted with the substituents defined hereinabove.

Steroids have the basic core structure depicted hereinbelow:

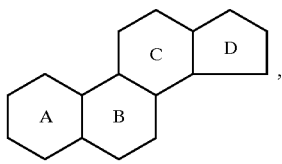

with the rings conventionally designated as A, B, C and D.

The preferred steroidal monocarboxylic acids used in the present invention have the formula:

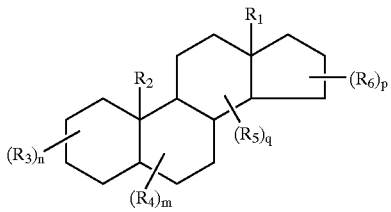

wherein $R_1$ and $R_2$ are independently hydrogen or lower alkyl;

each $R_3$, $R_4$, $R_5$ and $R_6$ are independently, hydrogen or one of the substituents defined hereinabove on R. It is preferred that each $R_3$, $R_4$, $R_5$ and $R_6$ are independently hydrogen, hydroxy, lower alkoxy, lower alkyl, oxo, carboxy, lower alkyl substituted by carboxy, lower alkoxy substituted by carboxy, lower carbalkoxy wherein one and only one of $R_3$, $R_4$, $R_5$ or $R_6$ contains a carboxy group.

In the above formula, n is 0–4;

p is 0–4; and m and q are independently 0–2.

It is to be noted that n, m, q and p indicate the number of substituents on each ring. For example, when n is 1, the A ring contains 1 $R_3$ substituent and the remaining groups on the A ring are hydrogen; when n is 2, the A ring contains 2 $R_3$ substituents, which $R_3$ substituents may be the same or different. However, when n is 0, then the A ring is unsubstituted. The same is true with respect to $(R_4)_m$, $(R_5)_q$ and $(R_6)_p$. At least one of the rings is substituted and contains a carboxy group, either substituted on the ring or a substituent which is itself substituted by carboxy. It is preferred that the carboxy group is substituted on the ring or on a lower alkyl group which is substituted on one of the rings. It is more preferred that the carboxy group is substituted on an alkyl group which is substituted on one of the rings, and it is even more preferred that the carboxy group is at the terminal end of the alkyl group. It is most preferred that the carboxy group is substituted on an alkyl group which is substituted on the D ring.

The more preferred steroid acid has the formula

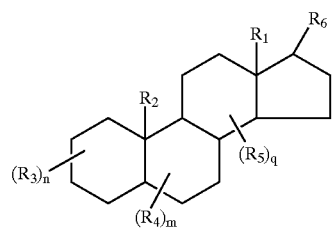

wherein $R_6$ is a lower alkyl group containing a carboxy, and $R_1$, $R_2$, $R_3$, $R_4$, $R_5$, n, m and q are as defined hereinabove.

The preferred $R_1$ is $CH_3$.
The preferred $R_2$ is $CH_3$.
It is preferred that $R_3$ is OH.
$R_4$, when present is preferably OH.
It is preferred that n is 1. It is also preferred that q is 0.
The preferred value of m is 0 or 1.

It is preferred that $R_6$ is a $C_1$–$C_4$ alkyl group substituted by COOH, which $R_6$ may be straight chained or branched. The preferred $R_6$ contains the COOH substituted at the terminal carbon. It is even more preferred that $R_6$ is branched. In the most preferred embodiment, $R_6$ is a butyl moiety and more preferably an iso-butyl substituted at the terminal carbon with carboxy, i.e.,

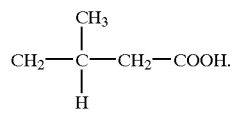

An even more preferred steroid acid has the formula

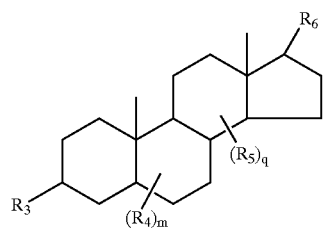

wherein $R_3$, $R_4$, $R_5$ and $R_6$ are as defined hereinabove. The preferred steroidal acids are cholic acid, lithocholic acid, chenodeoxycholic acid and deoxycholic acid.

As defined herein, lactones of the monocarboxylic acid ring may be used in place of the monocarboxylic acid. Lactones are, by definition, cyclic esters. They may be formed by the intramolecular reaction of hydroxylated or halogenated carboxylic acid with elimination of water or hydrogen halide, respectively. The lactones are preferably 5, 6 or 7 membered rings, containing 1 ring oxygen and a carbon ring atom adjacent thereto substituted by oxo, with the remaining atoms in the ring being carbon atoms. The preferred ring size is 5 or 6 atoms.

Many of the sugar acids form lactones under mild conditions. The lactones formed from the sugar acids are preferably 5 or 6 membered, and these 5 or 6 membered lactones are preferred.

Examples of lactones include galactonic acid gamma-lactone and glucondeltalactone, and the like.

The carboxylic acids used in the present invention included α and β keto acids or hydroxy acids of the formula the formula 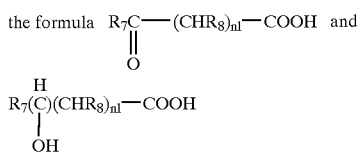 and $R_7(C)(CHR_8)_{n1}$—COOH with H above C and OH below C wherein $R_7$, $R_8$ and $n_1$ are as defined hereinabove. Preferably, $n_1$ is 0 or 1. If a keto acid or hydroxy acid is the carboxylic acid, it is preferred that it is a α-hydroxy acid or α-keto acid. Preferred keto and hydroxy acids are pyruvic acid, lactic acid and glycolic acid.

Examples of preferred monocarboxylic acids used in the present invention are formic acid, acetic acid, propionic acid, salicylic acid, acetyl salicylic acids, glucondeltalactone, benzoic acid, lactic acid, pyruvic acid, glycolic acid, cholic acid, lithocholic acid, deoxycholic acid, chenodeoxycholic acid, galactonic acid γ-lactone, sorbic acid, stearic acid, D-glucuronic acid, quinic acid, glycolic acid, folic acid, behenic acid, folic acid, and the like.

As indicated hereinabove, the acid used in the process for preparing a carbohydrate polymer may be an arylol. As defined herein, the arylol is an aryl group with an OH group substituent thereon. The aryl group may be further substituted by an alkyl group (i.e., alkylarylol) or alkenyl group (i.e., alkenylarylol), as defined herein. Thus, the term arylol includes OH substituted aryl, which aryl group may optionally be substituted with alkyl or alkenyl groups or combination of both. The aryl may be further unsubstituted or substituted with one or more electron withdrawing or electron donating substituents, as defined hereinabove. The aryl group may be substituted directly with a carboxy group or a lactone or a substituent on the aryl may be substituted with a carboxylic acid or lactone thereof. However, the aryl group or substituent thereon can have only one carboxy group or lactone thereof.

In this embodiment, when the acid is arylol, the most preferred aryl group is phenyl. The phenyl group may be further substituted by one or more of the substituents as described hereinabove, e.g., alkyl or alkenyl, or a substituent thereon may be substituted by one or more of these substituents. It is preferred, however, that the arylol, e.g., phenol, is substituted by an electron withdrawing group, such as nitro, lower alkenyl, and the like. Preferred examples include phenol, hydroxy-benzoic acid, e.g., p-hydroxy benzoic acid, and the like.

It is preferred that if the arylol group is substituted with alkyl or alkenyl, that the alkyl and alkenyl groups, each independently contain 1–6 carbon atoms. The alkenyl group may contain 1, 2, 3, 4, 5 or 6 carbon-carbon double bonds, and more preferably 1–4 carbon double bonds and most preferably 1 or 2 carbon-carbon double bonds.

The monocarboxylic acids or the lactones thereof and arylol, described hereinabove are either commercially available or are prepared by standard synthetic techniques without an undue amount of experimentation.

It is preferred that the amount of acid catalyst utilized in the polymerization reaction ranges between about 0.01 to about 25 mol % and more preferably from about 0.1 to about 10 mol % and even more preferably from about 0.1 to about 5 mol % and most preferably from about 0.1 mol % to about 1 mol % relative to the reactants used in the process. It is to be noted that as the amount of acid is increased, the rate of polycondensation increases. The use of larger amounts of acid, however, e.g., in amounts greater than about 25 mol %, in general, causes the formation of polycondensates which are too acidic for use in foodstuffs. Where acid concentrations become too high, problems may arise with regard to neutralizing and/or reducing or removing the excess acid which is present in the final product mixture.

The reaction is effected at temperatures effective for the polymerization reaction to occur. Preferably, the temperature should be at least about 130° C., and more preferably greater than about 140° C. The upper limit of course is the decomposition temperature of the reactants utilized.

The reaction may be effected in inert solvents, that is solvent which do not react with the products and reactants. However, it is preferred that the polymerization reaction is effected without the use of solvents. Moreover, it is preferred that the polymerization reaction is effected by homogeneously mixing the reactants.

As those skilled in the art will perceive, the amount of acid required for a particular polymerization, the polymerization duration, the polymerization temperature and the nature of the products desired are all interdependent. The selection of the amount of acid to be used in this invention should take account of these factors. It is preferred that the polymerization reaction is performed under anhydrous conditions or substantially anhydrous conditions. In an embodiment of the present invention, the reaction is performed in an inert atmosphere, such as under nitrogen or helium or under vacuum.

During the polymerization reaction, water is formed. The accumulation of water retards the reaction. Therefore, it is most beneficial to the reaction if the water formed is removed. This can be accomplished by techniques known to one of ordinary skill in the art.

The inclusion of a food acceptable polyol such as sorbitol in the saccharide-carboxylic acid reaction mixtures prior to polycondensation yields superior products. In most cases, about 80% or more (w/w) of the polyol cannot be isolated from the condensation product, demonstrating that it has been chemically incorporated in the polymer. These additives function as internal plasticizers to reduce viscosity, and also provide improved color and taste. This is evident, for example, in the manufacture of hard candy from such condensation polymers, where the rheological properties of the product are improved during processing, foaming is minimized, and a better tasting product of lighter color is obtained. Polyol concentrations of from about 5 to 20% by weight of the total reaction mixture provide such advantages, and levels of about 8–12% by weight are preferred.

In addition to sorbitol, other food-acceptable polyols can be used in the present process. Examples include glycerol, erythritol, xylitol, mannitol and galactitol, hydrogenated starch hydrolysates and the like. Disaccharide as well as oligosaccharide polyols are included in the definition of polyol or sugar alcohols as used herein. Examples of these higher polyols include lactitol and maltitol. Sorbitol, however, is preferred.

Chemical purification is not generally required for the products of this invention. It is preferred that the product produced in accordance with the present process is a carbohydrate polymer that is relatively soluble in water at 25° C.

As indicated hereinabove, it is preferred that the process described herein is used to prepare polydextrose (or polyglucose) and polymaltose.

The preferred polymerization process is polycondensation.

In an embodiment of the present invention, the reaction is effected by melt concentration, however it is not necessary to melt the sugar for the reaction to occur.

The following illustrates the polymerization process. Although the process described is directed to the melt polymerization process, it is just exemplary and used for illustrative purposes. Moreover, the following process is directed to the use of polydextrose. The production of polydextrose by this process is just exemplary. The process described hereinbelow is applicable to preparing other carbohydrate polymers and therefore the details described hereinbelow should not be considered to be limited to producing polydextrose or to just the melt polymerization process.

The preferred product produced by the present invention in accordance with the above-identified process is a soluble polydextrose or polymaltose. The resulting polydextrose products comprise branched chains of polydextrose wherein the linkage 1→6 predominates.

As used herein, the terms "polydextrose" and "polyglucose" are synonymous and are to be used interchangeably.

It will also be understood that the term "polydextrose", and "polymaltose" are intended to denote polymeric materials in which the majority of monomeric units contained therein are glucose or maltose, respectively.

The starting materials used in the present process are monosaccharides, the identity of which is dependent upon the carbohydrate polymer desired to be formed. For example, if the products desired to be formed polymaltose or polyglucose, then the starting monosaccharides are maltose or glucose, respectively. It will be readily apparent to those skilled in the art that dextrose or maltose suitable as raw materials can be obtained from a variety of sources, including, for example, acid or enzyme-catalyzed hydrolysis of naturally occurring glucose polymers. Thus, for example, dextrose can be obtained by hydrolysis of cellulose or hemicellulose while either dextrose or maltose or a mixture of both can be obtained by hydrolysis of starch. It will be further apparent that unpurified preparations such as starch hydrolysates, will be suitable as raw materials. Such materials are within the scope of the present invention.

The starting sugar, e.g., dextrose may be anhydrous or monohydrate solid or in solution.

In one of the preferred embodiments of the polymerization process, an anhydrous or a substantially anhydrous melt of the starting substances is expediently prepared in order to ensure homogenous mixing of the reaction components. The melt can be obtained, for example, by melting the starting substances at temperatures below the decomposition point or by evaporation of an aqueous solution of the starting saccharides, preferably under reduced pressure.

The anhydrous melt polymerization may be carried out at a pressure below atmospheric pressure. The preferred pressures do not exceed about 300 mm Hg, and range preferably, from about $10^{-5}$ to 100–300 mm Hg, which can be obtained by the use of a vacuum pump, a steam jet ejector, an aspirator or by other means commonly used in the art. The vacuum is required in order to exclude air from the polymerization and to remove the water of hydration and the water liberated in the polymerization reaction. Air should be excluded from the environment of the polymerizing mixture in order to minimize decomposition and discoloration of the polyglucoses or polymaltoses formed in the polymerization. A fine stream of nitrogen has also been found to be useful with this invention as a method for excluding air and removing the waters of hydration and polymerization which are formed. Where the nitrogen purge is used, the vacuum requirements are lessened but pressures of 100–300 mm Hg or less are still preferred.

The duration of the reaction and the reaction temperature are interdependent variables in the operation of this invention.

The reaction temperature for the melt condensation preferably ranges from about 140° C. to about 295° C. and more preferably ranges between about 140 and 280° C. The elevated temperature is of advantage for evaporating the water formed during the reaction. When carrying out the process batchwise, the temperature should expediently be between about 130 and 180° C., preferably between 140 and 160° C. The reaction time which is necessary to attain the desired degree of polymerization decreases with increasing temperature. At higher temperatures, the reaction time can be kept correspondingly short and in this way discoloration and caramelization can be avoided to as large an extent as possible. The temperatures used are preferably between about 150° C. and 280° C., preferably between 170 and 220° C. and more. The precise temperature for the anhydrous melt polymerization depends on several factors including, e.g., initial ratio of glucose, maltose or other sugars to the acid which is used, and the reaction time and the like, and it is within the skill of the ordinary skilled artisan to determine the proper temperature for the polymerization.

The production of a large proportion of soluble glucose or maltose polymers preferably utilizes catalytic amounts of organic acid as defined herein, e.g., monocarboxylic acid or lactone or arylol. Preferably, they are present in the ranges indicated hereinabove.

The thermal exposure (reaction time and temperature) used in the production of soluble carbohydrate polymers, e.g., polyglucoses or polymaltoses, by melt polymerization should be as low as possible, since discoloration, caramelization and degradation increase with prolonged exposure to high temperature. Fortunately, however, as the temperature of the polymerization is increased, the time required to achieve substantially complete polymerization decreases.

The progress of the polycondensation can be monitored by the disappearance of the starting material. This can be attributed to the evaporation of the water formed during the reaction.

In another process, the polycondensation is as described hereinabove except that the sugar is not melted but condensed under the reaction conditions described hereinabove in the presence of an organic acid, as defined herein and optionally but preferably in the presence of a polyol under polymerization conditions. In this embodiment, an anhydrous sugar or sugar substantially free of water, e.g., monohydrate, of the sugar, is mixed with acid and optionally polyol as described hereinabove. The above process may, for example, be utilized with a liquid sugar, e.g., liquid dextrose, under polymerization conditions described herein.

The inclusion of a food acceptable polyol such as sorbitol in the saccharide-carboxylic acid reaction mixtures prior to polycondensation yields superior products. In a preferred embodiment, the dextrose or maltose is subjected to melt polycondensation reaction in the presence of a monocarboxylic acid, as described herein and a polyol.

Further purification is not generally required for the products of this invention.

Neutralization of the carbohydrate polymers, e.g., polyglucoses or polymaltoses may be desirable for certain applications, despite the very low levels of acid catalyst which are employed. For example, where the products are to be used in dietetic foods containing whole milk, excess acid which may be present in the unneutrialized products will tend to curdle the milk. In the case of the soluble products, the solutions thereof are neutralized directly. This neutralization may be accomplished by techniques known to one of ordinary skill in the art, e.g., by adding suitable bases, e.g., carbonates, bicarbonates or hydroxides of alkali or alkaline earth metals, for example, potassium, sodium, calcium or magnesium to the solutions of polyglucose or polymaltose. Where sodium and potassium are used together, a physiologically balanced mixture may be used. Other materials which may be used to adjust the pH of soluble products of the process, such as, for example, polyglucose or polymaltose solutions, include 1-lysine, d-glucosamine, N-methyl glucamine and ammonium hydroxide. Other methods for reducing the acidity of solutions of the carbohydrate polymers are dialysis and ion exchange.

The acid associated with the carbohydrate polymer can also be neutralized by passing a concentrated aqueous solution of the carbohydrate polymer through one or more adsorbent resins, a weakly basic ion exchange resin, a type II strongly basic ion exchange resin or a mixed bed resin comprising a basic ion exchange resin, or a cation exchange resin as described in U.S. Pat. Nos. 5,667,593 and 5,645,647, the contents of both of which are incorporated by reference.

The carbohydrate polymer produced by the process described hereinabove may be further subjected to molecular sieving methods known to one of ordinary skill in the art such as ultrafiltration (UF), reverse osmosis (RO), size exclusion and the like. Moreover, the carbohydrate polymer may be subjected or if partially purified, may be further subjected to any other art recognized purification techniques.

Furthermore, the carbohydrate polymer produced hereinabove may be subjected to reduction, e.g., hydrogenation, using the techniques described in U.S. Pat. No. 5,601,863 to Borden, et al., U.S. Pat. No. 5,620,871 to Caboche, et al. and U.S. Pat. No. 5,424,418 to Duflot, the contents of which are incorporated by reference. The hydrogenated products may also be subjected to any of the purification methods described herein.

Decolorization of the soluble carbohydrate polymers, e.g., polyglucoses and polymaltoses, or hydrogenated or reduced produced by this invention is often desirable for certain uses. Soluble carbohydrate polymers, e.g., polyglucose or polymaltose or their hydrogenated products thereof may be decolorized by contacting the soluble carbohydrate polymer (e.g., polyglucose or polymaltose) with activated carbon or charcoal, by slurrying or by passing the solution through a bed of the solid adsorbent. Soluble carbohydrate polymers (e.g., polyglucoses and polymaltoses) may be bleached with sodium chlorite, hydrogen peroxide or similar material which are used for bleaching flour.

For the polyglucoses, the linkages which predominate are primarily 1→6, but other linkages also occur.

The polyglucoses as well as the carbohydrate polymers formed by the process herein have the utilities of the corresponding carbohydrate polymers if prepared by another method. For example, just as polydextrose formed by other methods, the polydextrose may be formed in accordance with the present process described hereinabove are substantially low or non-caloric.

The products of the process described herein can be used as dietetic fillers for a wide range of food-stuffs, such as confectionery, baked goods, ice cream and the like. The carbohydrate polymers prepared in accordance with the present process, especially soluble carbohydrate polymers, e.g., soluble polyglucoses and polymaltoses, are useful for imparting the physical properties of natural foods, other than sweetness, to dietetic foods from which the natural sugars have been removed and replaced by artificial or other sweeteners. In baked goods, for example the carbohydrate polymers affect rheology and texture in a manner analogous to sugar and can replace sugar as a bulking agent.

Other uses for the soluble carbohydrate polymers, e.g., polyglucoses, produced in accordance with the process described herein are found in low calorie jellies, jams, preserves, marmalades, and fruit butters; in dietetic frozen food compositions, including ice cream, iced milk, sherbet and water ices; in baked goods, such as cakes, cookies, pastries and other foodstuffs containing wheat or other flour; in icings, confectionery and confectionery like products, including chocolate, candy and chewing gum; in beverages such as non-alcoholic soft drinks and root extracts; in syrups; in toppings, sauces and puddings; in salad dressings and as bulking agents for dry low calorie sweetener compositions. The use of the carbohydrate polymers, e.g., polyglucoses, of this invention allows the elimination of 20–100% of the normal fat, oil or fatty triglycerides components of the food. The degree of fat, oil or fatty triglyceride elimination will naturally vary with the type of food; for example, in a French salad dressing, it is possible to completely eliminate the oily component normally included. In chocolate coatings, ice cream mixes and whipped toppings, 20–80% of the fat, oil or triglyceride can be eliminated while still retaining the required food characteristics such as texture, gloss, viscosity and taste of the food product.

In other types of food products, at least part of the carbohydrate ordinarily contained is replaced by the soluble carbohydrate polymers, especially polyglucoses produced in accordance with the present invention. Also, in some products at least part of the fatty-triglyceride and substantially all of the carbohydrate ordinarily contained is replaced by the soluble carbohydrate polymer, e.g., polyglucose produced in accordance with the process of the present invention.

This so-called fat-sparing effect is possible without decreasing the quality of the food, in that the required food characteristics such as texture, gloss, viscosity and taste are still retained. Furthermore, the calorific value of these foods is lowered considerably by the fact that the soluble carbohydrate polymers, e.g., polyglucoses, produced in accordance with the present invention can be used to replace sugars and fatty-triglycerides which are contained in the natural counterparts of the dietetic foods.

This fat-sparing effect is possible in dessert products such as puddings and ice creams. For example, about 0.2 to 1 part by weight of polydextrose produced in accordance herewith, replaces each part by weight of the fatty-triglyceride and carbohydrate normally present in the product.

In the case of garnishes such as salad dressings (e.g. Italian, French, Blue Cheese), mayonnaise, gravy mix and barbecue sauce, from about 0.3 to 3 parts by weight of carbohydrate polymer, e.g., polydextrose, produced in accordance with the present process replaces each part by weight of the fatty-triglyceride and carbohydrate normally present in the product.

In confections, such as sweet chocolate, whipped toppings and milk shakes, from about 0.3 to 1.5 parts by weight of the carbohydrate polymer, e.g., polydextrose, produced in accordance with the present process replaces each part by weight of the fatty-triglyceride and carbohydrate normally present in the product.

In leavened baked foods such as cakes, cookies and cupcakes, from about 0.25 to 1.5 part by weight of the carbohydrate polymer, e.g., polydextrose, produced in accordance with the present invention replaces each part by weight of the fatty-triglyceride and carbohydrate normally present in the product.

Artificial sweeteners which may be used in conjunction with the carbohydrate polymers, e.g., polydextrose formed in accordance with the present invention in these food products include saccharin, L-aspartyl-L-phenylalanine methyl ester, aspartyl-D-valine isopropyl ester, aspartyl amino malonates and dialkyl aspartyl aspartates, N-acylkynurenines, stevioside, glycyrrhizin neohesperidin dihydrochalcone, acesulfame K, alitame, talin, sucralose, and the like. The term L-aspartyl-L-phenylalanine methyl ester and methyl L-aspartyl phenylalanine are used interchangeably.

As previously mentioned, aside from the replacement of sugar in many recipes there is an appreciable flour sparing and/or fat sparing effect that is possible without decreasing the quality of the food. This of course, provides a further reduction in total calorie value of the food.

When the carbohydrate polymers, e.g., polyglucoses and polymaltoses are incorporated into dietetic foods, the resultant foods retain the palatable and appetizing qualities of their natural counterparts. Furthermore, the calorific value of these dietetic foods is lowered considerably by the fact that the products of this invention have been used to replace sugars, starches and fats which are contained in the natural counterparts of the dietetic foods.

The carbohydrate polymers produced in accordance with the present invention especially, the polydextrose, are useful as fillers in pharmaceutical compositions.

The carbohydrate polymers produced in accordance with the present invention also have non-food and non-pharmaceutical utilities and industrial utilities, just like polydextrose prepared by other processes.

The products prepared in accordance with the present process are different from the polysaccharides prepared by other processes, including the products obtained utilizing polybasic acids as the catalyst. Unlike the products prepared by utilizing the polybasic acids, the products prepared by the present invention do not have diester crosslinking associated therewith. Moreover, unlike the products of the present invention, the products utilizing polybasic acids do not have monocarboxylic acids associated therewith. But more importantly, the carbohydrate polymers produced by the present process, especially the polydextrose products, have reduced off-flavors, as compared to the polydextrose prepared by the process described in U.S. Pat. Nos. 3,766,165 and 3,876,794 using citric acid, or they have substantially eliminated the off-flavors associated with the products using citric acid and other polycarboxylic acids as the catalyst are completely eliminated. Furthermore, the carbohydrate polymers, e.g., polydextrose prepared in accordance with the present process prior to purification taste blander than the polydextrose or other sugar polymers prepared using polycarboxylic acid or phosphoric acid prior to purification.

The preferred product produced for in accordance with this invention is polydextrose.

The following non-limited examples further illustrate the invention.

In the following examples, the American Public Health Association (APHA) color of an aqueous solution of the polydextrose prepared in accordance with this invention was taken. It is to be noted that a color of zero on the APHA scale (colorless) is the most desirable.

EXAMPLE 1

A mixture of dextrose monohydrate (267 g), sorbitol (30 g) and Gluconodeltalactone (GDL) (3.0 g) was placed in a 2L glass container and heated under low pressure at 188° C. for approximately 20 min. while stirring. The reaction mixture was cooled to obtain the product as a glass which was powdered and used for analytical and applications tests. The color of the final product was 175 APHA without any post-treatments, and the residual glucose was 1.4%.

EXAMPLE 2

A mixture of dextrose monohydrate (267 g), sorbitol (30 g) and Benzoic acid (3.0 g) was placed in a 2L glass container and heated under low pressure at 182° C. for about 20 min. while stirring. The reaction mixture was cooled to obtain the product as a glass which was powdered and used for analytical and applications tests. The color of the final product was 175 APHA without any post-treatments, and the residual glucose was 2.5%.

EXAMPLE 3

A mixture of dextrose monohydrate (267 g), sorbitol (30 g) and Benzoic acid (0.3 g) was placed in a 2L glass container and heated under low pressure at 180° C. for about 15 min. while stirring. The reaction mixture was cooled to obtain the product as a glass which was powdered and used for analytical and applications tests. The color of the final product was approximately 225 APHA without any post-treatments, and the residual glucose was 1%.

EXAMPLE 4

A mixture of dextrose monohydrate (267 g), sorbitol (30 g) and acetic acid (3.0 g) was placed in a 2L glass container and heated under low pressure at 180° C. for about 45 min. while stirring. The reaction mixture was cooled to obtain the product as a glass which was powdered and used for analytical and applications tests. The color of the final product was 200 APHA without any post-treatments, and the residual glucose was 1.5%.

EXAMPLE 5

A mixture of dextrose monohydrate (267 g), sorbitol (30 g) and acetic acid (0.35 g) was placed in a 2L glass container and heated under low pressure at 177° C. for about 21 min. while stirring. The reaction mixture was cooled to obtain the product as a glass which was powdered and used for analytical and applications tests. The color of the final product was 125 APHA without any post-treatments, and the residual glucose was 2.0%.

EXAMPLE 6

A mixture of dextrose monohydrate (269 g), sorbitol (30 g) and Lactic acid (0.6 g) was placed in a 2L glass container and heated under low pressure at 150° C. for about 15 min. while stirring. The reaction mixture was cooled to obtain the product as a glass which was powdered and used for analytical and applications tests. The color of the final product was 100 APHA without any post-treatments, and the residual glucose was 3.3%.

EXAMPLE 7

A mixture of dextrose monohydrate (270 g), sorbitol (30 g) and Cholic acid (0.09 g) was placed in a 2L glass container and heated under low pressure at approximately 154° C. for approximately 80 min. while stirring. The reaction mixture was cooled to obtain the product as a glass which was powdered and used for analytical and applications tests. The color of the final product was 175 APHA without any post-treatments and the residual glucose was 56%.

EXAMPLE 8

A mixture of dextrose monohydrate (269 g), sorbitol (30 g) and salicyclic acid (0.6 g) was placed in a 2L glass container and heated under low pressure at 160° C. for about 50 min. while stirring. The reaction mixture was cooled to obtain the product as a glass which was powdered and used for analytical and applications tests. The color of the final product was 100 APHA without any post-treatments, and the residual glucose was 5.5%.

EXAMPLE 9

A mixture of dextrose monohydrate (269 g), sorbitol (30 g) and pyruvic acid (0.06 g) was placed in a 2L glass container and heated under low pressure at 160° C. for about 90 min. while stirring. The reaction mixture was cooled to obtain the product as a glass which was powdered and used for analytical and applications tests. The color of the final product was 150 APHA without any post-treatments, and the residual glucose was 5.7%.

EXAMPLE 10

A mixture of dextrose monohydrate (270 g), sorbitol (30 g) and Lithocholic acid (0.9 g) was placed in a 2L glass container and heated under low pressure at temperatures ranging from 152C to 168C for about 100 minutes while stirring. The reaction mixture was cooled to obtain the product as a glass which was powdered and used for analytical and applications tests. The residual glucose was 2.8%.

EXAMPLE 11

A mixture of dextrose monohydrate (270 g), sorbitol (30 g) and chenodeoxycholic acid (0.09 g) was placed in a 2L glass container and heated under low pressure at 159° C. for about 90 min. while stirring. The reaction mixture was cooled to obtain the product as a glass which was powdered and used for analytical and applications tests. The residual glucose was 3.6%.

EXAMPLE 12

A mixture of dextrose monohydrate (270 g), sorbitol (30 g) and salicylic acid (1.5 g) was placed in a 2L glass container and heated under low pressure at 159° C. for about 25 min. while stirring. The reaction mixture was cooled to obtain the product as a glass which was powdered and used for analytical and applications tests. The color of the final product was 100 APHA without any post-treatments, and the residual glucose was 4.6%.

EXAMPLE 13

A mixture of dextrose monohydrate (269 g), sorbitol (30 g) and D-Glucuronic acid (0.75 g) was placed in a 2L glass container and heated under low pressure at temperatures ranging from 152C–169C for about 40 min. while stirring. The reaction mixture was cooled to obtain the product as a glass which was powdered and used for analytical and applications tests. The color of the final product was 150 APHA without any post-treatments, and the residual glucose was 3.9%.

EXAMPLE 14

A mixture of dextrose monohydrate (269 g), sorbitol (30 g) and stearic acid (0.75 g) was placed in a 2L glass container and heated under low pressure at 157° C. for about 140 min. while stirring. The reaction mixture was cooled to obtain the product as a glass which was powdered and used for analytical and applications tests. The color of the final product was 150 APHA without any post-treatments, and the residual glucose was 3.0%.

EXAMPLE 15

A mixture of dextrose monohydrate (269 g), sorbitol (30 g) and Quinic acid (0.75 g) was placed in a 2L glass container and heated under low pressure at 154° C. for 20 min. while stirring. The reaction mixture was cooled to obtain the product as a glass which was powdered and used for analytical and applications tests. The color of the final product was 100 APHA without any post-treatments, and the residual glucose was 3.3%.

EXAMPLE 16

A mixture of dextrose monohydrate (269 g), sorbitol (30 g) and sorbic acid (0.75 g) was placed in a 2L glass container and heated under low pressure at 154° C. for about 107 min. while stirring. The reaction mixture was cooled to obtain the product as a glass which was powdered and used for analytical and applications tests. The color of the final product was 100 APHA without any post-treatments, and the residual glucose was 4.4%.

EXAMPLE 17

A mixture of dextrose monohydrate (267 g), sorbitol (30 g) and Mucic acid (3 g) was placed in a 2L glass container and heated under low pressure at 154° C. for about 48 min. while stirring. The reaction mixture was cooled to obtain the product as a glass which was powdered and used for analytical and applications tests. The residual glucose was 1.4%.

EXAMPLE 18

A mixture of dextrose monohydrate (285 g), sorbitol (15 g) and Deoxycholic acid (0.09 g) was placed in a 2L glass container and heated under low pressure at 157° C. for about 30 min. while stirring. The reaction mixture was cooled to obtain the product as a glass which was powdered and used for analytical and applications tests. The color of the residual glucose was 9.0%.

EXAMPLE 19

A mixture of dextrose monohydrate (269 g), sorbitol (30 g) and Linolenic acid (0.75 g) was placed in a 2L glass container and heated under low pressure at 155° C. for about 75 min. while stirring. The reaction mixture was cooled to obtain the product as a glass which was powdered and used for analytical and applications tests. The color of the final product was 100 APHA without any post-treatments, and the residual glucose was 1.8%.

EXAMPLE 20

A mixture of dextrose monohydrate (267 g), sorbitol (30 g) and Acetylsalicyclic acid (3.0 g) was placed in a 2L glass container and heated under low pressure at 152° C. for about 40 min. while stirring. The reaction mixture was cooled to obtain the product as a glass which was powdered and used for analytical and applications tests. The residual glucose was 4.0%.

EXAMPLE 21

A mixture of dextrose monohydrate (267 g), sorbitol (30 g) and Glycolic acid (3 g) was placed in a 2L glass container and heated under low pressure at 156° C. for about 35 min.

while stirring. The reaction mixture was cooled to obtain the product as a glass which was powdered and used for analytical and applications tests. The residual glucose was 4.0%.

EXAMPLE 22

A mixture of dextrose monohydrate (267 g), sorbitol (30 g) and Glyoxylic acid (3 g) was placed in a 2L glass container and heated under low pressure at 155° C. for about 40 min. while stirring. The reaction mixture was cooled to obtain the product as a glass which was powdered and used for analytical and applications tests. The residual glucose was 4.9%.

EXAMPLE 23

A mixture of dextrose monohydrate (267 g), sorbitol (30 g) and Galacturonic acid (3 g) was placed in a 2L glass container and heated under low pressure at 135° C. for about 65 min. while stirring. The reaction mixture was cooled to obtain the product as a glass which was powdered and used for analytical and applications tests. The residual glucose was 4.4%.

EXAMPLE 24

A mixture of dextrose monohydrate (270 g), sorbitol (30 g) and Formic acid (0.3 g) was placed in a 2L glass container and heated under low pressure at 156° C. for about 75 min. while stirring. The reaction mixture was cooled to obtain the product as a glass which was powdered and used for analytical and applications tests. The color of the final product was 75 APHA without any post-treatments, and the residual glucose was 4.6%.

EXAMPLE 25

A mixture of dextrose monohydrate (267 g), sorbitol (30 g) and Commercial oleic acid (3 g) was placed in a 2L glass container and heated under low pressure at approximately 156° C. for about 30 min. while stirring. The reaction mixture was cooled to obtain the product as a glass which was powdered and used for analytical and applications tests. The residual glucose was 2.3%.

EXAMPLE 26

A mixture of dextrose monohydrate (297 g), and Gluconodeltalactone (3.0 g) was placed in a 2L glass container and heated under low pressure at 150° C. for about 30 min. while stirring. The reaction mixture was cooled to obtain the product as a glass which was powdered and used for analytical and applications tests. The color of the final product was 150 APHA without any post-treatments, and the residual glucose was 2.7%.

The above preferred embodiments and examples are given to illustrate the scope and spirit of the present invention. These embodiments and examples will make apparent to those skilled in the art other embodiments and examples. These other embodiments and examples are within the contemplation of the present invention.

Therefore, the present invention should be limited only by the appended claims.

What is claimed is:

1. A process for preparing a carbohydrate polymer which comprises polymerizing a sugar selected from the group consisting of a monosaccharide, dissacharide, oligosaccharide and hydrolysate of a carbohydrate polymer at a temperature below the point of substantial decomposition of said sugar and under reduced pressure and under conditions effective for polymerization in the presence of a catalytic effective amount of an organic acid thereof while removing water formed during said polymerization, said organic acid being a monocarboxylic acid or lactone thereof or arylol.

2. The process according to claim 1 wherein said organic acid is present in a range from 0.01 to about 25 mol % relative to the sugar.

3. The process according to claim 2 wherein said organic acid is present in amounts ranging from about 0.01 to about 1 mol %.

4. The process according to claim 1 wherein the organic acid is an arylol.

5. The process according to claim 4 wherein the organic acid is a phenol, alkyl substituted phenol or alkenyl substituted phenol, wherein the alkyl and alkenyl groups each independently contain 1–6 carbon atoms.

6. The process according to claim 1 wherein the organic acid is a monocarboxylic acid.

7. The process according to claim 1 wherein the organic acid is a steroid monocarboxylic acid, sugar monocarboxylic acid, aryl monocarboxylic acid, aralkyl monocarboxylic acid, aliphatic monocarboxylic acid, cycloaliphatic monocarboxylic acid, or heterocyclic monocarboxylic acid or heterocyclic alkyl monocarboxylic acid or combination thereof or a lactone of the organic acid.

8. The process according to claim 1 wherein the organic acid is aldouronic acid or aldonic acid.

9. The process according to claim 7 wherein the steroid monocarboxylic acid has the formula:

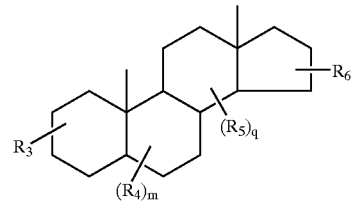

wherein each $R_3$, $R_4$, $R_5$ and $R_6$ are independently hydrogen, hydroxy, lower alkoxy, lower alkyl, oxo, carboxy or lower alkyl substituted with carboxy, n is 0–4;

p is 0–4; and n and q are independently 0–2, with the proviso that only one of $R_3$, $R_4$, $R_5$ or $R_6$ contains a carboxy group.

10. The process according to claim 9 wherein $R_6$ is an alkyl group substituted by carboxy, and p is 1.

11. The process according to claim 7 wherein the steroid monocarboxylic acid has the formula

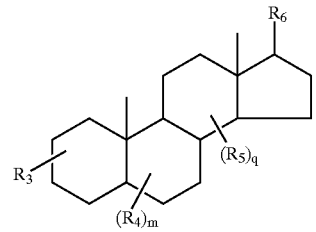

12. The process according to claim 1 wherein the organic acid is a monocarboxylic fatty acid.

13. The process according to claim 1 wherein the organic acid has the formula RCOOH wherein R is alkyl containing 1–24 carbon atoms or alkenyl containing 2–24 carbon atoms and 1, 2, 3 or 4 carbon-carbon double bonds, cycloaliphatic containing 3–18 ring carbon atoms, aryl containing 6–18 ring carbon atoms, arylalkyl containing 6–18 ring carbon atoms and 1–6 carbon atoms bridging the aryl group and the COOH, heterocyclic, heterocyclic alkyl, heteroaromatic or heteroaromatic alkyl, wherein heterocyclic contains 3–18 ring atoms and at least 1 ring and at most 4 ring heteroatoms, and the remainder are carbon ring atoms, heteroaromatic contains 5–18 ring atoms and at least 1 and at most 4 ring heteroatoms, and the remainder are carbon ring atoms wherein the heteroatom O or S; heterocyclic alkyl is an alkyl group containing 1–6 carbon atoms bridging a heterocyclic group and the COOH, and heteroaromatic alkyl is an alkyl group containing 1–6 carbon atoms bridging the heteroaromatic group and the COOH group.

14. The process according to claim 1 wherein the organic acid is benzoic acid, salicylic acid or acetyl salicylic acid.

15. The process according to claim 1 wherein the organic acid is a lactone of a monocarboxylic acid.

16. The process according to claim 15 wherein the lactone is glucono delta lactone.

17. The process according to claim 1 wherein from about 5 to 20% by weight of a food acceptable polyol is added prior to or during said polymerization.

18. The process according to claim 17 wherein the polyol is selected from the group consisting of sorbitol, glycerol, erythritol, xylitol, mannitol and galactitol.

19. The process according to claim 18 wherein the polyol is sorbitol.

20. The process according to claim 1 wherein polymerization occurs at a pressure of less than about 300 mm Hg.

21. The process according to claim 1 wherein the product is polydextrose.

22. The process according to claim 1 wherein the organic acid is glycolic acid, pyruvic acid or lactic acid.

23. The process according to claim 1 wherein the organic acid is a monocarboxylic acid or lactone thereof.

24. The process according to claim 19 wherein the product is polydextrose.

25. The process according to claim 1 wherein the product is polydextrose or polymaltose and the process comprises polycondensing a sugar selected from the group consisting of D-glucose and maltose at a temperature ranging from about 140° C. to about 295° C. and at reduced pressure in the presence of a catalytic effective amount of a said organic acid, while removing water formed during said polymerization organic acid being.

26. The process according to claim 25 wherein the process comprises melting the sugar at a temperature ranging from about 140° C. to about 295° C. and at reduced pressure in the presence of a catalytic effective amount of an organic acid, while removing water formed during said polymerization.

27. The process according to claim 25 wherein said organic acid is present in about 0.01 to about 25 mol % relevant to the sugar.

28. The process according to claim 27 wherein said organic acid is present in amounts ranging from about 0.01 mol % to about 1 mol %.

29. The process according to claim 25 wherein the organic acid is a steroid monocarboxylic acid, sugar monocarboxylic acid, aryl monocarboxylic acid, aralkyl monocarboxylic acid, aliphatic monocarboxylic acid, cycloaliphatic monocarboxylic acid, or heterocyclic monocarboxylic acid or heterocyclic alkyl monocarboxylic acid.

30. The process according to claim 25 wherein the organic acid is an arylol.

31. The process according to claim 30 wherein the organic acid is a phenol, alkyl substituted phenol or alkenyl substituted phenol, wherein the alkyl and alkenyl groups contain 1–6 carbon atoms.

32. The process according to claim 25 wherein the organic acid is a monocarboxylic acid or a lactone thereof.

33. The process according to claim 32 wherein the organic acid is a monocarboxylic acid.

34. The process according to claim 32 wherein the organic acid is a lactone of a monocarboxylic acid.

35. The process according to claim 25 wherein the organic acid is a sugar monocarboxylic acid.

36. The process according to claim 35 wherein the monocarboxylic acid is aldouronic acid or aldonic acid.

37. The process according to claim 29 wherein the steroid monocarboxylic acid has the formula:

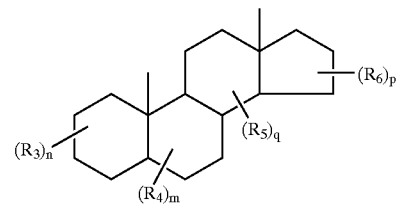

wherein each $R_3$, $R_4$, $R_5$ and $R_6$ are independently hydrogen hydroxy, lower alkoxy, lower alkyl, oxo, carboxy or lower alkyl substituted with carboxy, n is 0–4;

p is 0–4; and n and q are independently 0–2, with the proviso that only one of $R_3$, $R_4$, $R_5$ or $R_6$ contains a carboxy group.

38. The process according to claim 25 wherein the monocarboxylic acid is a fatty monocarboxylic acid.

39. The process according to claim 25 wherein the monocarboxylic acid has the formula RCOOH wherein R is alkyl containing 1–24 carbon atoms or alkenyl containing 2–24 carbon atoms and 1, 2, 3 or 4 carbon-carbon double bonds, cycloaliphatic containing 3–18 ring carbon atoms, aryl containing 6–18 ring carbon atoms, arylalkyl containing 6–18 ring carbon atoms and 1–6 carbon atoms bridging the aryl group and the COOH, heterocyclic, heterocyclic alkyl, heteroaromatic or heteroaromatic alkyl, wherein heterocyclic contains 3–18 ring atoms and at least 1 ring and at most 4 ring heteroatoms, and the remainder are carbon ring atoms; heteroaromatic contains 5–18 ring atoms and at least 1 and at most 4 ring heteroatoms, and the remainder are carbon ring atoms wherein the heteroatom is O, S or N; heterocylic alkyl is an alkyl group containing 1–6 carbon atoms bridging a heterocyclic group and the COOH; and heteroaromatic alkyl is an alkyl group containing 1–6 carbon atoms bridging the heteroaromatic group and the COOH group.

40. The process according to claim 25 wherein the organic acid is benzoic acid, salicylic acid or acetyl salicylic acid.

41. The process according to claim 25 wherein a polyol is additionally present.

42. The process according to claim 25 wherein the organic acid is a lactone of a sugar monocarboxylic acid.

43. The process according to claim 42 wherein the lactone is glucono delta lactone.

44. The process according to claim 25 wherein from about 5 to 20% by weight of a food acceptable polyol is added prior to or during said polymerization.

45. The process according to claim 44 wherein the polyol is selected from the group consisting of sorbitol, glycerol, erythritol, xylitol, mannitol and galactitol.

46. The process according to claim 45 wherein the polyol is sorbitol.

47. The process according to claim 25 wherein the polymerization occurs at a pressure of less than about 300 mm Hg.

48. The process according to claim 25 wherein the organic acid is an α-keto monocarboxylic acid or an α-hydroxy monocarboxylic acid.

49. The process according to claim 48 wherein the monocarboxylic acid is glycolic acid, pyruvic acid or lactic acid.

50. The process according to claim 1 wherein the carbohydrate polymer is subjected to purification.

51. The process according to claim 50 wherein purification comprises neutralizing the acid associated therewith.

52. The process according to claim 51 wherein neutralizing comprises contacting the carbohydrate polymer with base.

53. The process according to claim 51 wherein neutralizing comprises dialyzing the carbohydrate polymer.

54. The process according to claim 51 wherein neutralizing comprises making a concentrated solution of the carbohydrate polymer and passing said concentrated solution through an adsorbent resin.

55. The process according to claim 54 wherein the adsorbent resin is an ion exchange resin.

56. The process according to claim 50 wherein the carbohydrate polymer is contacted with molecular sieves.

57. The process according to claim 1 wherein the carbohydrate polymer is hydrogenated.

58. The process according to claim 57 wherein the carbohydrate polymer is subjected to purification and hydrogenation.

59. The process according to claim 58 wherein purification comprises neutralizing the acid associated with the carbohydrate polymer.

60. The process according to claim 59 wherein neutralizing comprises passing the carbohydrate polymer or the hydrogenated carbohydrate polymer through an ion-exchange resin.

61. The process according to claim 25 wherein the product is subjected to purification.

62. The process according to claim 61 wherein the purification comprises neutralizing the acid associated with the product.

63. The process according to claim 62 wherein neutralizing comprises contacting the product with base.

64. The process according to claim 62 wherein neutralizing comprises dialyzing the product.

65. The process according to claim 62 wherein neutralization comprises making a concentrated solution of the product and passing said concentrated solution through an adsorbent resin.

66. The process according to claim 65 wherein the adsorbent resin is an ion exchange resin.

67. The process according to claim 61 wherein the product is contacted with molecular sieves.

68. The process according to claim 25 wherein the product is hydrogenated.

69. The process according to claim 68 wherein the product is subjected to purification and hydrogenation.

70. The process according to claim 69 wherein purification comprises neutralizing the acid associated with the product or hydrogenated product.

71. The process according to claim 70 wherein neutralizing comprises making a concentrated solution of the product or hydrogenated product and passing the concentrated solution through an ion-exchange resin.

72. The product of claim 1.

73. The product of claim 25.

74. The product of claim 50.

75. A carbohydrate polymer associated with a monocarboxylic acid or lactone thereof.

76. The carbohydrate polymer of claim 75 which is further associated with a polyol.

77. The carbohydrate polymer according to claim 76 wherein the polyol is sorbitol.

78. A substantially purified product of any one of claims 75–77.

79. The carbohydrate polymer according to claim 75 or 76 which is purified by contacting the same with a base in sufficient quantity to substantially neutralize the acid associated therewith.

80. The carbohydrate polymer according to claim 75 or 76 which is passed through an adsorbent resin.

81. The carbohydrate polymer according to claim 80 wherein the adsorbent resin is an ion exchange resin.

82. The carbohydrate polymer according to claim 75 or 76 which is contacted with molecular sieve.

83. The carbohydrate polymer according to claim 82 which is subjected to purification.

84. The carbohydrate polymer according to claim 83 wherein the purification comprises neutralizing the acid associated therewith.

85. The carbohydrate polymer according to claim 84 wherein neutralizing comprises making a concentrated solution of the carbohydrate polymer and passing the concentrated solution through an ion exchange resin.

86. The carbohydrate polymer according to any one of claims 75–77 which is hydrogenated.

87. The carbohydrate polymer according to any one of claims 75–77 wherein the carbohydrate polymer is polydextrose or hydrogenated polydextrose.

88. A process for administering an edible organic acid to an animal which comprises (a) polymerizing a sugar selected from the group consisting of a monosaccharide, disaccharide, oligosaccharide and hydrolysate of a carbohydrate polymer at a temperature below the point of substantial decomposition of said sugar and under reduced pressure under polymerization effective conditions in the presence of a catalytic effective amount of an edible organic acid thereof while removing water formed during said polymerization, said organic acid being non-volatile, wherein said organic acid is a monocarboxylic acid or lactone thereof or arylol;

(b) adding the product of (a) to foodstuff or feed; and (c) administering the foodstuff or feed of (b) to said animal.

89. The process according to claim 88 wherein the animal is a human.

90. A process of making a food which comprises (a) polymerizing a sugar selected from the group consisting of a monosaccharide, disaccharide, oligosaccharide and hydrolysate of a carbohydrate polymer at a temperature below the point of substantial decomposition of said sugar and under reduced pressure and under polymerization effective conditions in the presence of a catalytic effective amount of an edible organic acid thereof while removing water formed during said polymerization, said organic acid being non-volatile, wherein said organic acid is a monocarboxylic acid or lactone thereof or arylol:

(b) adding the product of (a) to foodstuff or feed.

91. A foodstuff or feed containing a polymerized carbohydrate polymer prepared by the process comprising:

(a) polymerizing a sugar selected from the group consisting of a monosaccharide, disaccharide, oligosaccharide and hydrolysate of a carbohydrate polymer at a temperature below the point of substantial decomposition of said sugar and under reduced pressure under polymerization effective conditions in the presence of a catalytic effective amount of an edible organic acid thereof while removing water formed during said polymerization, said organic acid being non-volatile, said organic acid being a monocarboxylic acid or lactone thereof or arylol; and (b) adding the product of (a) to foodstuff or feed.

92. The process according to claim 1 wherein the monocarboxylic acid is a keto acid or hydroxy acid of the formula:

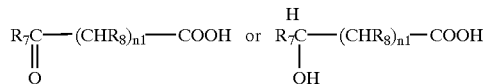

wherein $R_7$ and $R_8$ are independently lower alkyl, aryl or lower arylalkyl and $n_1$ is 0 or 1.

93. The process according to claim 92 wherein $n_1$ is 0.

94. The process according to claim 25 wherein the monocarboxylic acid is a keto acid or hydroxy acid of the formula:

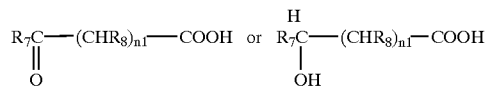

wherein $R_7$ and $R_8$ are independently lower alkyl, aryl or lower arylalkyl and $n_1$ is 0 or 1.

95. The process according to claim 94 wherein $n_1$ is 0.

* * * * *